(12) United States Patent
McCamley

(10) Patent No.: US 6,739,532 B2
(45) Date of Patent: May 25, 2004

(54) METHOD FOR SEPARATING ADHERED PAPER FROM PAPER-COVERED GYPSUM BOARD

(75) Inventor: John Anthony McCamley, Langley (CA)

(73) Assignee: New West Gypsum Recycling (B.C.) Inc., Langley (CA)

(*) Notice: Subject to any disclaimer, the term of this patent is extended or adjusted under 35 U.S.C. 154(b) by 0 days.

(21) Appl. No.: 10/114,363

(22) Filed: Apr. 3, 2002

(65) Prior Publication Data

US 2003/0189116 A1 Oct. 9, 2003

(51) Int. Cl.7 .............................................. B02C 19/12
(52) U.S. Cl. ............................. 241/24.14; 241/24.15; 241/24.19; 241/81; 241/DIG. 38
(58) Field of Search ................... 241/79.1, DIG. 38, 241/81, 24.14, 24.15, 24.18, 24.19, 24.21

(56) References Cited

U.S. PATENT DOCUMENTS

| | | | |
|---|---|---|---|
| 3,790,091 A | | 2/1974 | Law et al. ................. 241/24 |
| 4,815,667 A | * | 3/1989 | Keller ...................... 241/14 |
| 4,896,836 A | * | 1/1990 | Mitchell ................... 241/81 |
| 5,593,096 A | | 1/1997 | Harker et al. ............. 241/14 |
| 5,855,664 A | * | 1/1999 | Bielecki et al. ......... 405/129.9 |
| 6,295,794 B1 | | 10/2001 | Nordt et al. ............. 53/467 |

FOREIGN PATENT DOCUMENTS

| | | |
|---|---|---|
| DE | 20004472 | 5/2000 |
| EP | 824972 | 2/1998 |
| WO | WO00/71257 | 11/2000 |

OTHER PUBLICATIONS

Nicolai, M. "Konfiguration Wirtschaftlicher Bauschuttaufbereitungen", Muell und Abfall, Schmidt Verlag, Berlin, vol. 26, No. 12, Dec. 1, 1994, pp. 781–792, 794–795.

* cited by examiner

Primary Examiner—Mark Rosenbaum
(74) Attorney, Agent, or Firm—Oyen Wiggs Green & Mutala

(57) ABSTRACT

A method and apparatus for separating adhered paper from paper-covered gypsum board, involving passing the gypsum board past a magnet to automatically remove ferrous materials from the gypsum board without stopping the process/apparatus, pulverizing that gypsum board into a screenable mixture of pieces of paper and smaller separated gypsum board particles, and then screening that mixture and segregating the pieces of paper from the gypsum board particles. This method and apparatus may optionally also include an area for manually pre-sorting and removing non-gypsum materials from the gypsum board prior to pulverization, may optionally also include additional screening steps, and may optionally also include passing the screened and segregated gypsum board particles past a second magnet. The magnets may have self-cleaning belts.

12 Claims, 5 Drawing Sheets

METHOD FOR SEPARATING ADHERED PAPER FROM PAPER-COVERED GYPSUM BOARD

TECHNICAL FIELD

This invention relates to the separation of adhered paper from paper-covered gypsum board, and has application in the recovery and recycling of gypsum and paper from paper-covered gypsum board.

BACKGROUND

In the residential and commercial construction industries, gypsum board with paper adhered to the surfaces thereof (often referred to as gypsum wallboard, or simply wallboard) is an extensively used building material. Generally, it is supplied in the form of large rectangular sheets, which the builder cuts to size depending upon the particular project.

Although efforts may be made to minimize the wastage of material, a single construction site will often generate a substantial amount of leftover gypsum wallboard pieces which are essentially useless and which require disposal. A need for disposal also arises when homes or buildings containing gypsum wallboard are demolished.

Historically, the disposal of wallboard material has posed a problem. At the very least it is an uneconomic nuisance and, in some jurisdictions, it is considered to be an unacceptable environmental hazard. The material is not readily degradable and disposal may be prohibited at conventional dumps or waste fill sites. In some cases, the material is transported by barge and disposed of at sea.

The disposal problem arises because waste wallboard has no significant practical purpose so long as the paper and gypsum board remain adhered together. Further, when exposed to the weather and outside environmental conditions, the combination can deteriorate to a polluting sludge of paper and gypsum. On the other hand, if the paper and the gypsum board are separated, the sludge problem can be avoided. Furthermore, if the separation is sufficiently complete, then the paper and/or the gypsum can be recycled.

Accordingly, efforts have been made to achieve a separation of the adhered paper from scrap wallboard. One such method has involved the pulverization of the wallboard, but the resulting product has been a somewhat inefficient and difficult-to-manage mixture of gypsum board particles and paper fluff. Even so, pulverization is preferable over another known method of using a shredder in conjunction with one-stage or twostage air aspiration to separate paper from non-paper waste; the shredder produces a great deal of fluff and the aspirators are expensive and complicated. As well, it is understood that chemical processes have been tried, but with results considered unsatisfactory either by reason of insufficient separation or excessive cost.

U.S. Pat. No. 5,593,096 is a suggested improved method and apparatus for wallboard recycling wherein the wallboard is hammermilled through holes of a hammermill grate, the hole size being selected to produce a screenable mixture of pieces of paper and separated gypsum particles, which can then in turn be screened to segregate the pieces of paper from the gypsum particles. However, this method and apparatus have a number of disadvantages:

1. Inability to easily separate ferrous materials such as steel from gypsum board prior to hammermilling, resulting in safety and component wear hazards associated with ejection of shrapnel from the hammermill under high force and damage to the hammermill itself.
2. Inability to achieve relatively uniform feed to the hammermill resulting in: (a) the hammermill being plugged with excess gypsum material, thus resulting in poorer separation of gypsum core from the paper, and (b) poorer screening resulting in more paper in the gypsum product and more gypsum in the paper product.
3. Lack of a manual sorting station to supplement screen separation resulting in foreign objects, such as wood, concrete, plastics, aluminum, green waste, putrescible garbage, etc. in the end products and more wear and maintenance to the hammermill.

What is required is a new and improved method and apparatus for separating adhered paper from paper-covered gypsum board. Ideally, the method and apparatus should be able to separate and segregate a substantial amount of adhered paper from paper covered gypsum in a continuous and efficient manner, while minimizing wear and damage to the hammermill or other pulverizer and ensuring safety.

SUMMARY OF INVENTION

In accordance with a broad aspect of the method of the present invention there is provided a method of separating adhered paper from paper-covered gypsum board, the method comprising the steps of:

(a) Feeding wet and/or dry gypsum board into a feed hopper and onto a conveyor;
(b) Conveying the gypsum board past a magnet to remove ferrous materials prior to being fed into a hammermill or other type of pulverizer;
(c) Fracturing the gypsum board in a hammermill or other type of pulverizer; and
(d) Sieving pulverized gypsum board through at least one screen to segregate paper and gypsum particles.

This method can, if desired, be combined with one or more of the following optional performance enhancing steps:

(a) Prior to conveying the gypsum past the magnet, providing an area wherein non-gypsum debris such as plastic, insulation, wood, concrete, aluminum, green waste, garbage, etc. can be manually sorted and removed from the gypsum;
(b) After sieving pulverized gypsum board through the first screen, resieving the coarsely screened gypsum board through a finer screen to achieve improved gypsum/paper separation; and
(c) Conveying the coarsely sieved and/or finely sieved gypsum past one or more additional magnets to further purify the gypsum product of ferrous debris (e.g. screws, corner bead pieces, nails, etc.).

BRIEF DESCRIPTION OF DRAWINGS

In Figures which illustrate non-limiting embodiments of the invention.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Figure 1:
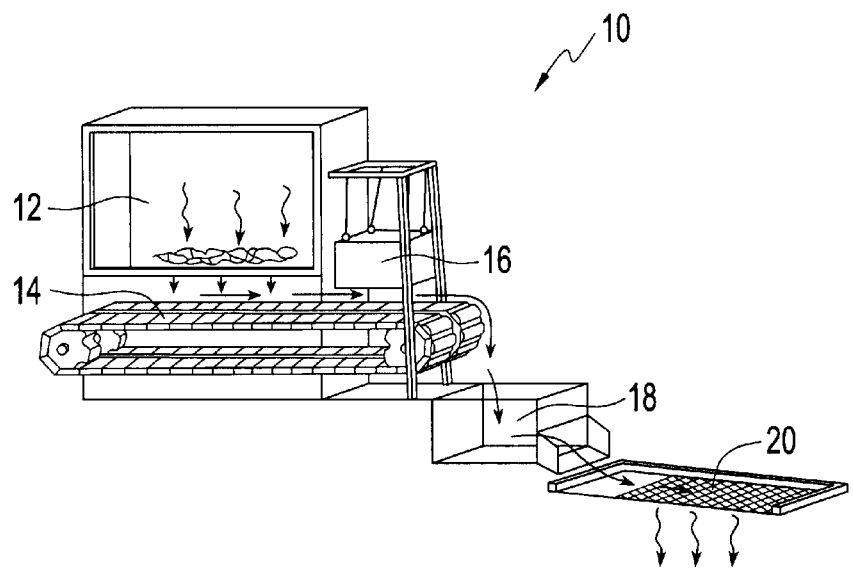
FIG. 1 is a perspective elevation view, partially cut-away, of a separation apparatus according to an embodiment of the present invention, and which implements the method of the present invention.

FIG. 1 illustrates a separation apparatus 10 embodying the present invention and which implements the method of the present invention. Separation apparatus 10 comprises a feed hopper 12 for receiving wet and/or dry gypsum, a conveyor 14 for conveying the gypsum from feed hopper 12 for pulverizing, a magnet 16 positioned over or proximate to conveyor 14 for automatically removing ferrous materials from the gypsum during normal operation of conveyor 14, a pulverizer 18 for fracturing and breaking the gypsum, and a screen 20 for segregating said fractured and broken pieces of gypsum. Feed hopper 12 is preferably a steel hopper that allows for a large amount of gypsum to be fed in a controlled manner. Conveyor 14 is preferably a drag chain conveyor operated in conjunction with feed hopper 12 and equipped with a variable frequency drive that controls the rate at which conveyor 14 feeds gypsum into pulverizer 18. By using a variable frequency drive, separation apparatus 10 can be configured to achieve relatively uniform feed of gypsum to pulverizer 18 and thereby: (a) reduce or eliminate clogging of pulverizer 18 with excessive gypsum, resulting in better separation of paper from gypsum; and (b) improve screening, resulting in less paper in the segregated gypsum material and less gypsum in the segregated paper material.

Conveyor 14 conveys gypsum under magnet 16, or otherwise past magnet 16, in order to automatically remove ferrous materials from the gypsum prior to the feeding of the gypsum into pulverizer 18. By utilizing magnet 16 to automatically remove loose ferrous materials, such as nails, screws, and corner bead pieces, the invention reduces safety hazards associated with the ejection of shrapnel from pulverizer 18 under high force and reduces the likelihood of wear and damage to pulverizer 18 itself. Using a magnet to remove loose ferrous materials is also useful after pulverization to remove ferrous materials further loosened by the pulverization (as explained below), but the use of magnetic separation before pulverization is especially useful for the protection of both human operators and the equipment itself.

Magnetic separation according to the present invention is automatically accomplished without deactivating separation apparatus 10 or otherwise disrupting the flow of the process. Otherwise, separation apparatus 10 would need to be frequently deactivated in order to permit a human operator to remove ferrous waste, which would dramatically reduce gypsum separation output. This invention, on the other hand, allows for essentially uninterrupted operation of separation apparatus 10, which, in turn, permits a variable frequency drive to be utilized to control conveyor 14 to achieve relatively uniform and uninterrupted feed of gypsum to pulverizer 18.

In FIG. 1, pulverizer 18 is a pulverizer of conventional design such as a Maxigrind 500 pulverizer manufactured by CMI Corporation of Oklahoma City, Okla. Such a conventional pulverizer will work in accordance with the invention, although a hammermill is preferred (for the reasons set out above and as further detailed below). Screen 20 is positioned at the output of pulverizer 18 to segregate pieces of paper and gypsum particles output by pulverizer 18.

In operation of separation apparatus 10, wet and/or dry gypsum is fed into feed hopper 12 and then is dropped by feed hopper 12 onto conveyor 14. Conveyor 14 then conveys the gypsum material under or otherwise past magnet 16 to automatically remove ferrous materials before the gypsum material enters pulverizer 18. Pulverizer 18 fractures and breaks the gypsum material into smaller pieces that can be more easily screened and segregated. The fractured and broken gypsum material falls from the output of pulverizer 18 onto a screen 20 to segregate pieces of paper and gypsum particles. The pieces of paper tend to be larger than the gypsum particles. A screen size is selected that permits most gypsum particles to fall through screen 20 but that prevents most pieces of paper from similarly falling through.

Figure 2:
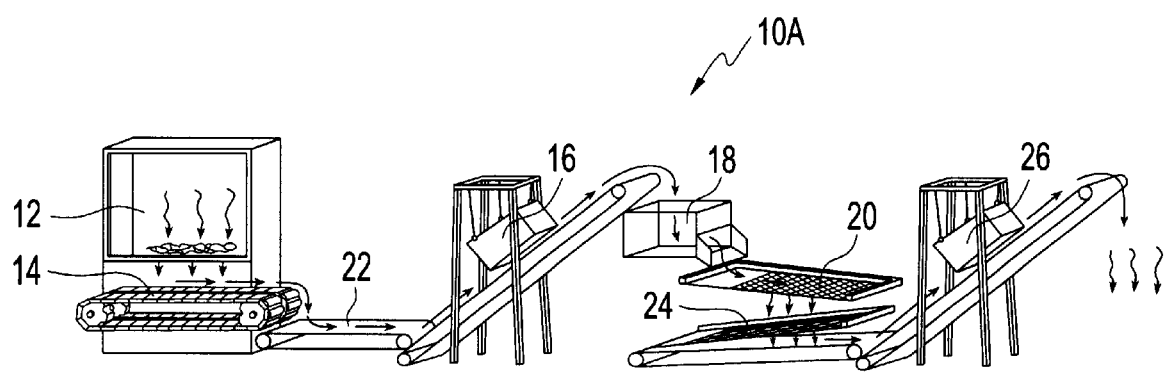
FIG. 2 is a perspective elevation view, partially cut-away, of a separation apparatus according to a first alternative embodiment of the invention, and which also implements the method of the present invention.

FIG. 2 illustrates a separation apparatus 10A that is identical to the separation apparatus 10 illustrated in FIG. 1, other than the fact that it further comprises additional optional performance enhancing techniques/components. Referring to FIG. 2, separation apparatus 10A further comprises an optional manual pre-sorting section in the form of a presorting belt 22, wherein non-gypsum debris can be manually sorted and removed from the gypsum prior to the gypsum passing under magnet 16 and being fed into pulverizer 18. Also, separation apparatus 10A further comprises an optional second screen 24 having smaller openings than screen 20 for finer screening and segregating. In particular, smaller pieces of paper and gypsum that fall through the relatively coarse screen 20 can be further screened and segregated by screen 24. Separation apparatus 10A also further comprises an optional second magnet 26 for the automatic removal of any remaining ferrous materials.

In operation of separation apparatus 10A, wet and/or dry gypsum is fed into feed hopper 12 and then is dropped by feed hopper 12 onto conveyor 14. Conveyor 14 then conveys the gypsum material to pressorting belt 22, where non-gypsum material is manually sorted out and removed without stopping separation apparatus 10A. The presorted gypsum material is then conveyed under or past magnet 16 to automatically remove ferrous materials before the gypsum material enters pulverizer 18. Pulverizer 18 fractures and breaks the gypsum material into smaller pieces that can be more easily screened and segregated. The fractured and broken gypsum material falls from the output of pulverizer 18 onto a screen 20 to segregate pieces of paper and gypsum particles according to the method described above. Smaller pieces of paper and gypsum dust fall through screen 20 onto screen 24, where the material is further segregated before being conveyed under second magnet 26 for the automatic removal of remaining ferrous materials.

Figure 3:
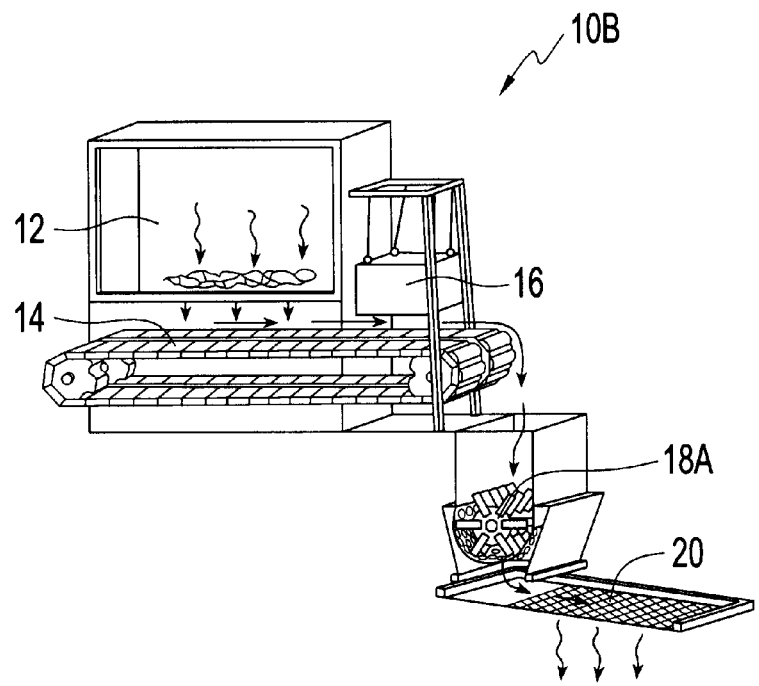
FIG. 3 is a perspective elevation view, partially cut-away, of a separation apparatus according to a second alternative embodiment of the invention, and which also implements the method of the present invention.

FIG. 3 illustrates a separation apparatus 10B that is identical to the separation apparatus 10 illustrated in FIG. 1, other than the fact that pulverizer 18 has been replaced with a hammermill 18A. Hammermill 18A is a hammermill pulverizer of conventional design, but is preferably a hammermill pulverizer similar to that described in U.S. Pat. No. 5,593,096 as producing exemplary results, namely, an H1100 Tub Grinder manufactured by Haybuster Manufacturing Inc. of Jamestown, N. Dak. A hammermill pulverizer is preferable over a conventional pulverizer such as pulverizer 18 illustrated in FIG. 1 because a hammermill pulverizer better processes wet as well as dry gypsum, resulting in a more effective separation of paper from the core of the gypsum board. In separation apparatus 10B, hammermill 18A comprises a lower grate having holes of about 2" in diameter, and works well with its rotor driven at about 1750 rpm with a 60 HP motor (not shown). Otherwise, the structure and operation of separation apparatus 10B are identical to those of separation apparatus 10.

Figure 4:
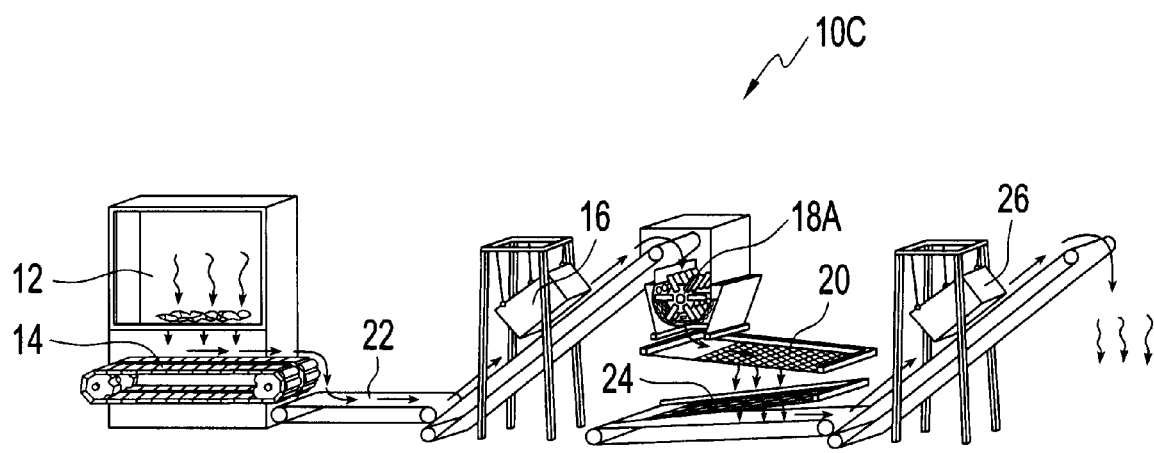
FIG. 4 is a perspective elevation view, partially cut-away, of a separation apparatus according to a third alternative embodiment of the invention, and which also implements the method of the present invention.

FIG. 4 illustrates a separation apparatus 10C that is identical to the separation apparatus 10A illustrated in FIG. 2, other than the fact that pulverizer 18 has been replaced with the hammermill 18A described above in respect of FIG. 3. Otherwise, the structure and operation of separation apparatus 10C are identical to those of separation apparatus 10A.

Figure 5:
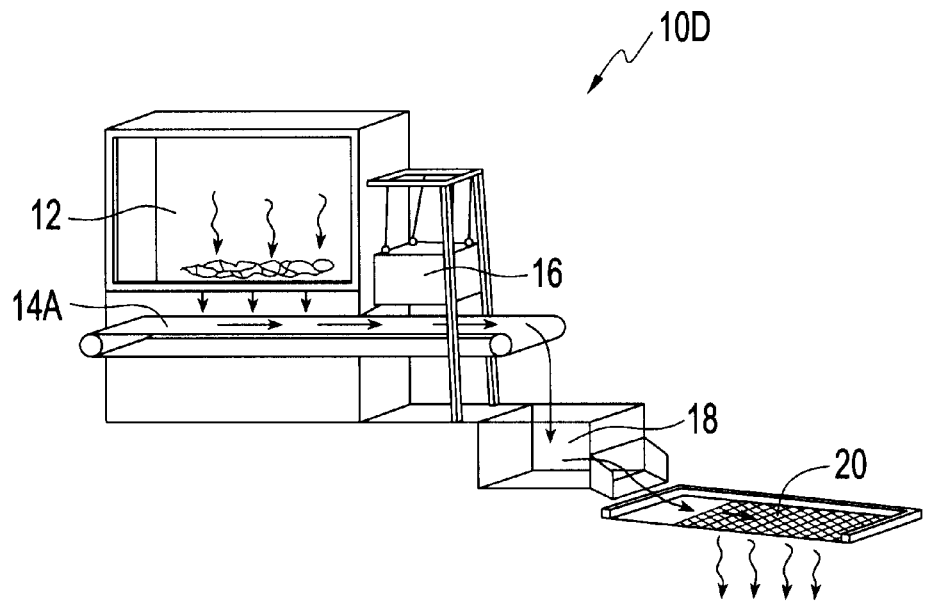
FIG. 5 is a perspective elevation view, partially cut-away, of a separation apparatus according to a fourth alternative embodiment of the invention, and which also implements the method of the present invention.

FIG. 5 illustrates a separation apparatus 10D that is identical to the separation apparatus 10 illustrated in FIG. 1, other than the fact that the drag chain conveyor 14 has been replaced with a conventional feed conveyor 14A. In practice, any type of conveyor can be used, each with its own advantages and disadvantages, which would be apparent to one skilled in the art of such conveyors. Otherwise, the structure and operation of separation apparatus 10D are identical to those of separation apparatus 10.

Figure 6:
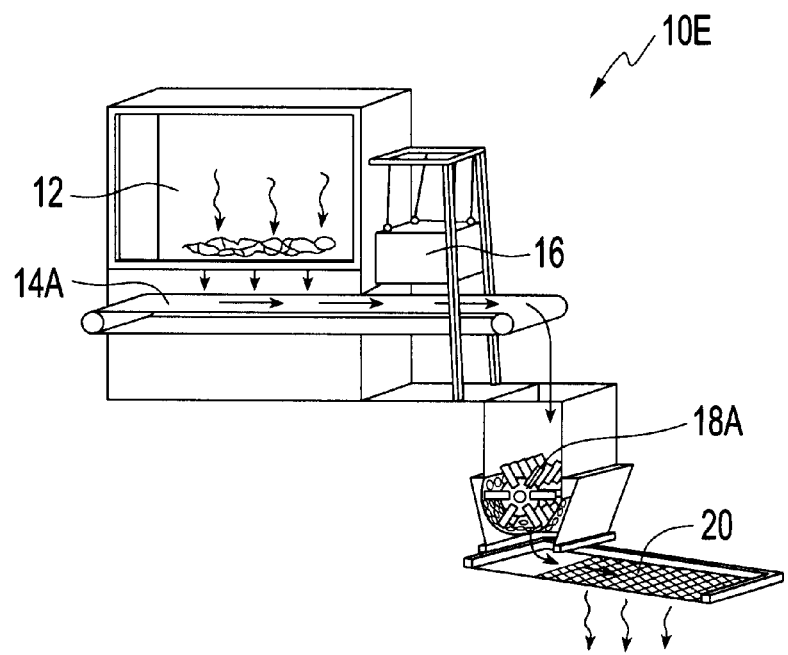
FIG. 6 is a perspective elevation view, partially cut-away, of a separation apparatus according to a fifth alternative embodiment of the invention, and which also implements the method of the present invention.

FIG. 6 illustrates a separation apparatus 10E that is identical to the separation apparatus 10D illustrated in FIG. 5, other than the fact that pulverizer 18 has been replaced with the hammermill 18A described above in respect of FIG. 3. Otherwise, the structure and operation of separation apparatus 10C are identical to those of separation apparatus 10D.

Figure 7:
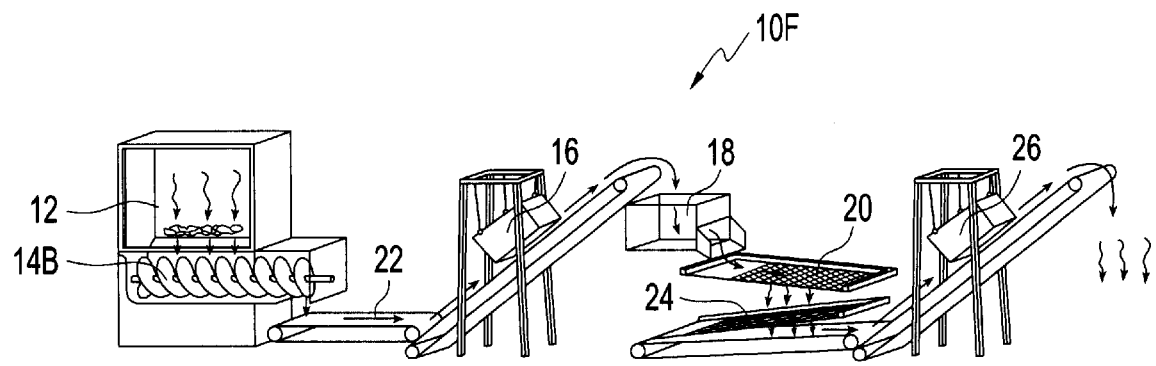
FIG. 7 is a perspective elevation view, partially cut-away, of a separation apparatus according to a sixth alternative embodiment of the invention, and which also implements the method of the present invention.

As can be seen from FIGS. 1 to 6, different combinations of conveyors and pulverizers can be selected to suit any given set of parameters/requirements without departing from the scope of the invention. Indeed, the conveyor can be replaced with anything that effectively and efficiently moves the gypsum to pulverizer 18 or hammermill 18A or presorting belt 22, as the case may be. For example, FIG. 7 illustrates a separation apparatus 10F that is identical to the separation apparatus 10A illustrated in FIG. 2, other than the fact that conveyor 14 has been replaced with an auger screw-feeder 14B. Auger screw-feeder 14B crushes the material as it is rotated along the screws, resulting in material that is more even in size and loosening embedded metal to make it easier for magnet 16 to remove. Even so, a drag chain conveyor as illustrated in FIG. 2 is preferable to an auger screw-feeder 14B, since auger screw-feeder 14B is more likely to cause undesirable shredding of the gypsum, resulting in excessive fluff. Otherwise, the structure and operation of separation apparatus 10F are identical to those of separation apparatus 10A.

Figure 8:
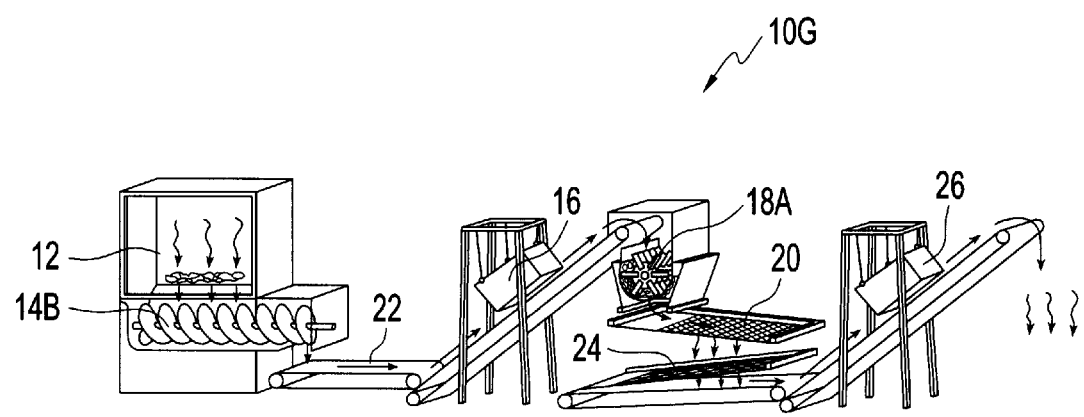
FIG. 8 is a perspective elevation view, partially cut-away, of a separation apparatus according to a seventh alternative embodiment of the invention, and which also implements the method of the present invention.

FIG. 8 illustrates a separation apparatus 10G that is identical to the separation apparatus 10F illustrated in FIG. 7, other than the fact that pulverizer 18 has been replaced with the hammermill 18A described above in respect of FIG. 3. Otherwise, the structure and operation of separation apparatus 10G are identical to those of separation apparatus 10F.

Figure 9:
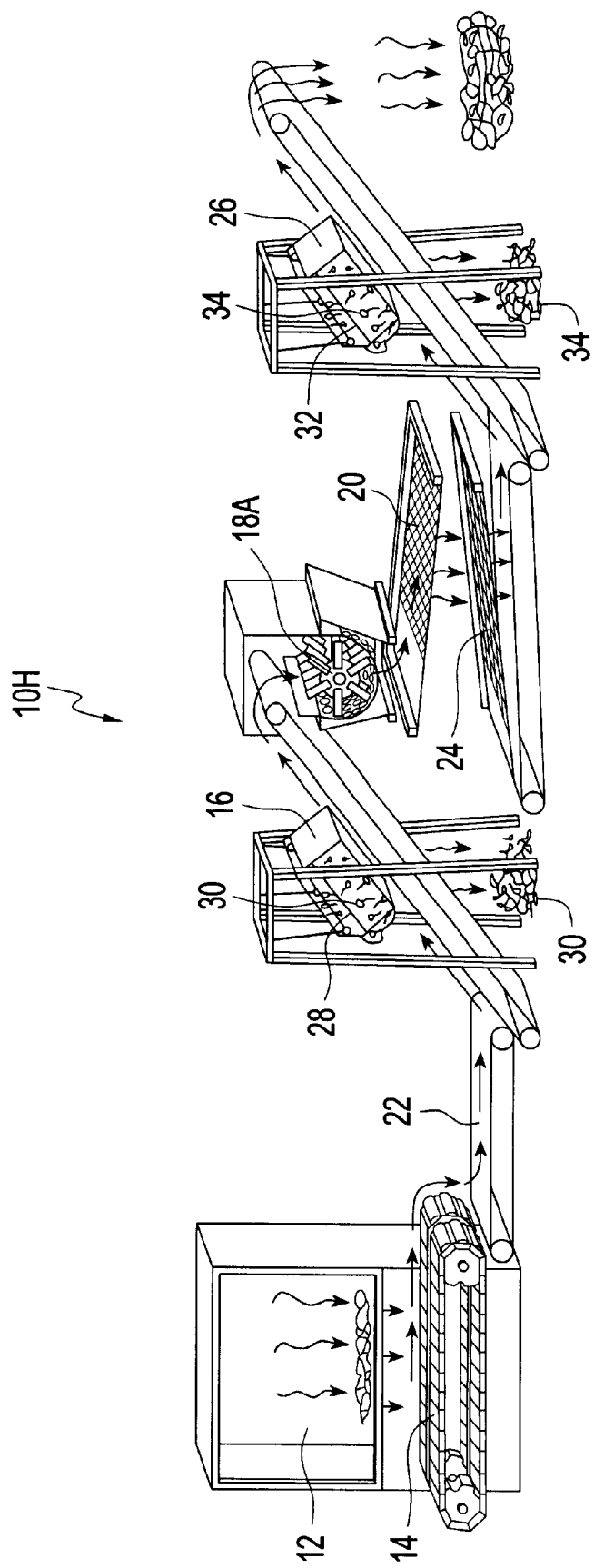
FIG. 9 is a perspective elevation view, partially cut-away, of a separation apparatus according to an eighth alternative embodiment of the invention, and which also implements the method of the present invention.

FIG. 9 illustrates a separation apparatus 10H that is identical to the separation apparatus 10C illustrated in FIG. 4, but with a further improvement. In separation apparatus 10H, magnet 16 has a self-cleaning belt 28. Self-cleaning belt 28 is essentially a conveyor belt surrounding magnet 16, and is preferably positioned to move perpendicular to the path of the gypsum. In operation, as gypsum passes under or proximate to magnet 16, ferrous materials 30 are attracted from the passing gypsum by magnet 16 and held to the rotating self-cleaning belt 28 until they pass from under magnet 16, at which point, ferrous materials 30 are dropped from self-cleaning belt 28 to a suitable place away from the passing gypsum. Self-cleaning belt 28 typically operates from a power source separate from magnet 16. Self-cleaning belt 28 is operated at a speed fast enough to prevent excessive ferrous materials accumulating on self-cleaning belt 28, but slow enough to allow magnet 16 to attract ferrous materials adequately and drop such ferrous materials from the end of the self-cleaning belt 28. A speed of 15 r.p.m., for example, may be suitable. The use of a self-cleaning belt 28 prevents excessive accumulation of ferrous materials on magnet 16, and permits continuous operation of separation apparatus 10H without interruption even to clean magnet 16. Similar to separation apparatus 10C in FIG. 4, separation apparatus 10H has a second magnet 26 for post-pulverization magnetic separation. In separation apparatus 10H, magnet 26 has a self-cleaning belt 32 identical or similar to the self-cleaning belt 28 of magnet 16. Self-cleaning belt 32 operates in the same manner self-cleaning belt 28, although ferrous materials 34 removed by magnet 26 and self-cleaning belt 32 would obviously be finer than the ferrous materials 30 removed by magnet 16 and self-cleaning belt 28. Magnets having a self-cleaning magnetic belt are known in the art, and include Master Magnets Ltd.'s Model No. MASTERMAG 10 PCB 5 K EL, although other self-cleaning magnets, such as those described at the Internet website of Global Equipment Marketing Inc.'s Magnetic Division at www.globalmagnetics. com, would also work. Other than self-cleaning belts 28, 32, the structure and operation of separation apparatus 10H are identical to those of separation apparatus 10C.

Separation apparatus 10H is a particularly preferred embodiment of the present invention, taking the best elements of separation apparatuses 10, 10A, 10B, 10C, 10D, 10E, 10F, and 10G, along with the further improvement of the self-cleaning belts 28, 32. The use of a drag chain conveyor 14 and a hammermill 18A reduce undesirable fluff, the use of magnets 16, 26 both before and after pulverization automatically reduce metal contamination and safety hazards without disrupting the continuous operation of separation apparatus 10H (especially when operated in conjunction with self-cleaning belts 28, 32), and the pre-sorting belt 22 and multiple screens 20, 24 permit finer screening and segregation.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A method of separating adhered paper from paper-covered gypsum board, including relatively damp gypsum board, comprising:
    (a) conveying unpulverized payer-covered gypsum board past a magnet;
    (b) after conveying said gypsum board past said magnet, fracturing said gypsum board to a screenable mixture of pieces of paper and smaller separated gypsum board particles; and
    (c) screening said mixture to segregate a substantial amount of said pieces of paper from said gypsum board particles.

2. A method as claimed in claim 1, further comprising manually sorting and removing non-gypsum materials from said gypsum board prior to conveying said gypsum board past said magnet.

3. A method as claimed in claim 1, wherein said screening step comprises passing said mixture through a plurality of screens of decreasing coarseness.

4. A method as claimed in claim 1, wherein said magnet has a self-cleaning belt.

5. A method as claimed in any of claims 1 to 4, further comprising conveying said screened and segregated gypsum board particles past a second magnet.

6. A method as claimed in claim 5, wherein said second magnet has a self-cleaning belt.

7. A method as claimed in claim 1, wherein said conveying step comprises conveying said gypsum board under a magnet.

8. A method as claimed in claim 1, wherein said conveying step comprises conveying said gypsum board on a drag chain conveyor.

9. A method as claimed in claim 1, wherein said conveying step comprises conveying said gypsum board on a feed conveyor.

10. A method as claimed in claim 1, wherein said conveying step comprises conveying said gypsum board through an auger screw-feeder.

11. A method as claimed in claim 1, wherein said fracturing step comprises pulverizing said gypsum board.

12. A method as claimed in claim 1, wherein said fracturing step comprises pulverizing said gypsum board in a hammermill.

* * * * *